(12) United States Patent
Moe et al.

(10) Patent No.: US 8,588,759 B2
(45) Date of Patent: Nov. 19, 2013

(54) CELL IDENTIFIER CONFLICT AVOIDANCE

(75) Inventors: Johan Moe, Mantorp (SE); Pål Frenger, Linköping (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1029 days.

(21) Appl. No.: 11/838,770

(22) Filed: Aug. 14, 2007

(65) Prior Publication Data

US 2009/0047956 A1 Feb. 19, 2009

(51) Int. Cl.
H04W 4/00 (2009.01)
H04W 24/00 (2009.01)
H04W 36/00 (2009.01)
H04W 40/00 (2009.01)
H04B 7/216 (2006.01)

(52) U.S. Cl.
USPC ........ 455/422.1; 455/423; 455/424; 455/425; 455/446; 455/436; 370/320; 370/335; 370/441

(58) Field of Classification Search
USPC .............. 455/436–444, 446, 422.1, 423–425; 370/320, 335, 441
See application file for complete search history.

(56) References Cited

U.S. PATENT DOCUMENTS

| 6,061,337 | A | 5/2000 | Light et al. |
| 6,449,482 | B1* | 9/2002 | Johansson et al. ............ 455/443 |
| 2005/0130655 | A1 | 6/2005 | Lundh et al. |
| 2005/0148368 | A1* | 7/2005 | Scheinert et al. ............ 455/561 |
| 2006/0121907 | A1* | 6/2006 | Mori et al. ................... 455/447 |
| 2006/0172707 | A1* | 8/2006 | Stern-Berkowitz et al. ............ 455/67.11 |
| 2006/0234713 | A1 | 10/2006 | Oswal et al. |
| 2007/0093268 | A1* | 4/2007 | Hosono et al. ............... 455/561 |
| 2007/0097938 | A1 | 5/2007 | Nylander et al. |
| 2008/0039141 | A1* | 2/2008 | Claussen et al. ............. 455/561 |

FOREIGN PATENT DOCUMENTS

| EP | 1657950 | 5/2006 |
| EP | 1740002 | 1/2007 |
| JP | 06350595 | 12/1994 |
| JP | 06350595 A * | 12/1994 |
| WO | WO 2005/006798 | 1/2005 |
| WO | WO 2005/032190 | 4/2005 |
| WO | WO 2005091667 A1 * | 9/2005 |
| WO | WO 2008/020969 | 2/2008 |
| WO | WO 2008/104196 | 8/2008 |
| WO | WO 2008/113373 | 9/2008 |

OTHER PUBLICATIONS

3GPP TS 36.300 V0.1.0 (Oct. 2006), Section 8.2 p. 32.*

(Continued)

Primary Examiner — Jean Gelin
Assistant Examiner — Dung Hong
(74) Attorney, Agent, or Firm — Nixon & Vanderhye P.C.

(57) ABSTRACT

The technology described automatically resolves cell identity collisions/conflicts in a cellular radio communications network. A detecting node determines that a first cell identifier associated with a first conflicting cell is the same as a second cell identifier associated with a second conflicting cell. One of the first and second conflicting cells is selected to change its cell identifier. A different cell identifier is determined for the selected cell. The different cell identifier is then provided to other cells and preferably to user equipment (UE) terminals without disrupting ongoing UE communications.

28 Claims, 16 Drawing Sheets

(56) References Cited

OTHER PUBLICATIONS

International Search Report mailed Jan. 1, 2009 in corresponding PCT Application PCT/SE2008/050903.
International Search Report and Written Opinion of the International Searching Authority mailed Dec. 23, 2008 in corresponding PCT Application PCT/SE2008/050907.
U.S. Appl. No. 11/838,753, filed Aug. 14, 2007; Inventor: Frenger.
U.S. Appl. No. 11/773,752, filed Jul. 5, 2007; Inventor: Moe et al.
European Application No. PCT/EP2007/001737 filed Feb. 28, 2007, Inventor: Moe et al.
3GPP TSG-SA5 *"Discussion on Automatic Neighbour Relation Lists for Te,"* (Telecom Management) Meeting SA5#53, May 7-11, 2007, Sophia Antipolis, France, S5-070974.
3GPP TS 36.00 V8.1.0, $3^{rd}$ *Generation Partnership Project; Technical Specification Group Radio Access Network; Evolved Universal Terrestrial Radio Access (E-UTRA) and Evolved Universal Terrestrial Access Network (E-UTRAN)*; Release 8, Jun. 2007, pp. 1-106.
Breitbach et al., *"Operator Use Cases Related to self Organising Network"*, T-Mobile, Aug. 1, 2007, pp. 1-55.
International Preliminary Report mailed Feb. 25, 2010 in corresponding International Application No. PCT/SE2008/050907.
Office Action mailed May 26, 2010 in co-pending U.S. Appl. No. 11/838,753.
Office Action mailed Dec. 8, 2010 in co-pending U.S. Appl. No. 11/838,753.
European office action mailed Sep. 6, 2011 in corresponding European Application No. 08 779 460.8-2412.
Ericsson, UE Measurements and Reporting of Global Cell Identity, 3GPP TSG-RAN WG2 #58bis; R2-072674, Jun. 22, 2007; XP050135465.
Ericsson, MCI Conflict Detection and Resolution, 3GPP TSG-SA5 (Telecom Management), S5-071569, Aug. 22, 2007; XP050306211.
M. Amirijoo et al., Neighbor Cell Relation List and Measured Cell Identity Management in LTE, Network Operations and Management Symposium 2008, IEEE, Apr. 7, 2008, pp. 152-159, XP031290513.
Office Action in related Chinese Patent Application No. 200880102742.8 dated Aug. 3, 2012.
European Communication mailed Dec. 2, 2011 in corresponding EP Application No. 08 779 464.0.
English Translation of Chinese Official Action dated Jan. 31, 2013 in Chinese Application No. 200880102742.8.
Chinese Search Report dated Jan. 31, 2013 in Chinese Application No. 200880102742.8.

\* cited by examiner

SS = Signature sequence associated with cell

CELL IDENTIFIER CONFLICT AVOIDANCE

RELATED APPLICATION

This application is related to commonly-assigned Ser. No. 11/838,753, entitled "Automated and Seamless Change of Change of Reporting Cell Identity," Moe et al., the contents of which are incorporated here by reference.

TECHNICAL FIELD

The technical field relates to mobile radio communications involving mobile radio terminals and radio base stations in a mobile radio communications system.

BACKGROUND

Universal Mobile Telecommunications System (UMTS) is a 3rd Generation (3G) mobile communication system employing Wideband Code Division Multiple Access (WCDMA) technology standardized within the 3$^{rd}$ Generation Partnership Project (3GPP). In the 3GPP release 99, the radio network controller (RNC) controls resources and user mobility. Resource control includes admission control, congestion control, and channel switching which corresponds to changing the data rate of a connection.

The Long Term Evolution (LTE) of UMTS is under development by the 3rd Generation Partnership Project (3GPP) which standardizes UMTS. There are many technical specifications hosted at the 3GPP website relating to Evolved Universal Terrestrial Radio Access (E-UTRA) and Evolved Universal Terrestrial Radio Access Network (E-UTRAN), e.g., 3GPP TS 36,300. The objective of the LTE standardization work is to develop a framework for the evolution of the 3GPP radio-access technology towards a high-data-rate, low-latency and packet-optimized radio-access technology. In particular, LTE aims to support services provided from the packet switched (PS)-domain. A key goal of the 3GPP LTE technology is to enable high-speed packet communications at or above about 100 Mbps.

FIG. 1 illustrates an example of an LTE type mobile communications system 10. An E-UTRAN 12 includes E-UTRAN NodeBs (eNBs) 18 that provide E-UTRA user plane and control plane protocol terminations towards the user equipment (UE) terminals 20 over a radio interface. An eNB is sometimes more generally referred to as a base station, and a UE is sometimes referred to as a mobile radio terminal or a mobile station.

Each base station transmits a signature sequence over an entire cell area for the UE terminals to detect and measure. Measurements performed by the UE terminals on the received signal strength of different base station signature sequences are used in most radio communication systems (e.g. GSM, WCDMA, LTE, WCDMA-2000 etc.) to perform, e.g., initial cell selection and handover decisions. A signature sequence in WCDMA includes a particular scrambling code that is applied to the common pilot channel transmitted from each NodeB. The WCDMA standard specifies 512 unique scrambling codes with 512 corresponding MCIs. In LTE, a signature sequence is two-dimensional and is generated as a symbol-by-symbol product of a two-dimensional orthogonal sequence and a two-dimensional pseudo-random sequence. In total, the LTE standard defines 510 such unique signature sequences with 510 corresponding MCIs. In LTE, UEs measure the signature sequence for neighboring cells to determine a reference symbol received power (RSRP), and these RSRP measurements are used when performing initial cell selection for UEs to "camp" on as well as when performing handovers of UE connections.

Ideally, the signature sequences that a single UE can detect are uniquely mapped to a particular base station. But in most radio communication systems, the number of unique signature sequences that a particular standard specifies is less than the number of base stations in the system. The number of signature sequences is limited because transmission of a signature sequence is associated with a radio resource cost, i.e., power, bandwidth, code space, frequency space, or time, and that cost increases with the number of unique signature sequences for which the system is designed. Another reason why the number of signature sequences is limited relates to the UE mobile stations frequently reporting measurements related to the different signature sequences back to the radio network, e.g., to the serving base station. A UE may report several such measurements several times per second, and therefore, it is desirable that such measurement reports can be encoded with fewer bits to reduce the impact of those reports on the limited radio bandwidth.

In light of these considerations, a one-to-one mapping may be established between a signature sequence transmitted by the base station and a measurement cell identity (MCI) used by the UEs in the encoded measurement reports. The term MCI is used here as a convenient way of specifying which particular signature sequence a given base station is transmitting. An MCI may be viewed as an index that permits the UE to determine the corresponding signature sequence.

UEs continuously monitor system information as well as the signature sequences broadcasted by base stations within range to inform themselves about "candidate" base stations in the service area. When a UE needs access to services from a radio access network, it sends a request over a random access channel (RACH) to a suitable base station, typically a base station with the most favorable radio conditions. As shown in FIG. 1, the base stations are interconnected with each other by means of an X2 interface. The base stations are also connected by an S1 interface to an Evolved Packet Core (EPC) 14 which includes a Mobility Management Entity (MME) by an S1-MME and to a System Architecture Evolution (SAE) Gateway by an S1-U. The MME/SAE Gateway is as a single node 22 in this example. The S1 interface supports a many-to-many relation between MMEs/SAE Gateways and eNBs. The E-UTRAN 12 and EPC 14 together form a Public Land Mobile Network (PLMN). The MMEs/SAE Gateways 22 are connected to directly or indirectly to the Internet 16 and to other networks.

One important focus area in LTE/SAE standardization work is to ensure that the evolved network is simple to deploy and cost efficient to operate. The vision is that the evolved network will be self-optimizing and self-configuring in as many aspects as possible. A self-configuration process is one where newly-deployed nodes are configured by automatic installation procedures to get the necessary basic configuration for system operation. A newly-deployed base station typically contacts a central server (or several such servers) in the network and obtains configuration parameters needed in order to start operating. Self-optimization is a process where UE and base station measurements and performance measurements are used to automatically "tune" the network. One example is automating neighbor cell lists, and one non-limiting way of automatically building neighbor cell lists is described in commonly-assigned, U.S. patent application Ser. No. 11/538,077, filed on Oct. 3, 2006, and published as US 2007/0097938, the contents of which are incorporated herein by reference. In GSM and WCDMA, base stations send neighbor cell lists to connected UEs so they have a defined set of cell broadcasts to measure (e.g., the signal quality or strength of those broadcasts) to permit determination of which if any neighbor cells is a suitable candidate for handover. In an LTE system, neighbor cell relation (NCR) lists are also used in the eNBs to set up connections over the X2 and/or S1 interfaces.

An area potentially advantageous for self-configuring is automatic assignment of shorter measurement cell identities (MCIs) to base stations. Shorter cell identifiers like an MCI used in the UE measurement reports frequently transmitted to the network reduce the amount of radio resources consumed. The shorter cell identifiers are therefore sometimes referred to here as reporting cell identifiers. In addition to the short MCI, each cell is associated with a longer cell identity that uniquely identifies the cell within the public land mobile radio network (PLMN) to which the cell belongs. A non-limiting example of such a longer identifier is a cell identity on the PLMN level (CIPL).

With a limited number of MCIs or other reporting cell identifiers, some MCIs are likely to be reused in larger networks, which means network planning is needed. Today, such planning is typically done manually. For example, when planning in an LTE RAN, each cell in the network is assigned an MCI, and the planner tries to distribute the MCIs so that neighboring cells do not have the same MCI. But such attempts may not always be successful. This is true even if this operation is to be performed automatically using a suitable allocation algorithm implemented on a computer. An automatic MCI allocation algorithm should preferably also be capable of assigning MCIs in difficult networks deployments, e.g., networks with a large number of home base stations over which the network operator has little control.

In order to perform a handover in LTE from a source cell to a target cell, the two involved cells must first set up a neighbor cell relation (NCR). The NCR contains at least the MCI (or other short cell identifier) and the CIPL (or other longer cell identifier). The NCR may also include connectivity information such as the IP address of the corresponding cell, information about the configurations of the X2 and S1 interfaces, and parameters needed for different radio resource management control algorithms, such as handover thresholds. Information about the radio access technology (RAT) (e.g., LTE, WCDMA, or GSM) as well as other capabilities of the target cell may also be included in the NCR.

Building the NCR list in each base station can be done automatically. Each time a new base station is deployed, it contacts a central server in the network and that server assigns the base station with a CIPL and an IP address. The base station may begin operation with an empty NCR list, and each time it receives a measurement report from a served UE that contains a MCI that is not included in the NCR, the base station asks the UE to obtain the CIPL of that corresponding (non-serving) base station. In LTE, the CIPL is broadcasted (infrequently) on the broadcast channel (BCH) which allows the UE to detect the corresponding CIPL of the non-serving base station and report it back to the serving base station. The serving base station can then contact the central server to obtain the remaining NCR information corresponding to that non-serving base station.

When a base station has two neighbors with different CIPLs but with the same MCI, there is an MCI "collision" or conflict. As a result, one or more cells must change its old colliding MCI to a non-colliding MCI. To make this change requires closing down the cell, reconfiguring the new MCI value, and then restarting the cell. Alternatively, the cell may just change the MCI without closing and restarting, which means that all the UEs currently "camped" on that cell loose synchronization disturbing all active UE communications in that cell. Those disturbed UEs must perform new cell searches likely resulting in at least most of them selecting that same cell and performing a random access attempt. Such a mass random access is problematic because the typical random access channel is not designed to handle a large number of simultaneous access attempts. Alternatively, those UEs could select another, less satisfactory cell.

Another problem with such MCI collisions is that all neighboring cells to the cell with the new MCI no longer have correct and current information in their respective neighbor cell relation (NCR) lists. Consequently, when those neighboring cells receive measurement reports from the UEs using the new MCI, the neighboring cells must then re-establish their relationship to the cell with the new MCI. Until then, the neighboring cells can not order any UEs to perform a handover to that cell, which could result in dropping those calls that need handover being dropped.

MCI collisions will cause significant problems when new home or other base stations are set up without any coordination in a densely populated area (e.g., Manhattan). Each time a consumer sets up a home base station or moves the location of that home base station, there is a high likelihood of many MCI collisions because the network operator is not in control of that base station set up or movement and therefore can not do the cell planning/coordination needed to avoid MCI collisions. During the "roll-out" phase of a new network, new cells will be added, and MCI collisions are also likely to occur as a result. "Relay" base stations may also be installed in moving vehicles like cars, buses, and trains. Because these base stations move around, frequent MCI collisions may be experienced. Also, other autonomous changes in a self-organizing network, like adjustments in power levels or in antenna tilt, may cause MCI collisions to occur.

Most of the MCI collisions manifest themselves as ambiguities in NCR lists, i.e., two cells with different CIPLs but with the same MCI are listed in the NCR list. However, it is also possible that a UE experiences acceptable radio conditions to the serving cell and the candidate cell and that both use the same MCI. In that case, the UE may not be able to report the weaker cell as a candidate cell to the serving cell because the weaker cell is directly interfered by the serving cell on the same signature sequence. To intuitively explain why this is the case, consider two different scenarios.

In the first scenario, only the serving cell is transmitting a signature sequence. The UE searches for this signature sequence by cross-correlating a received signal with the same signature sequence. If the received signal contains the corresponding signature sequence, then the cross correlation output contains a distinct peak. The location of the peak provides the UE with time synchronization, and the amplitude of the peak is proportional to the signal strength of the corresponding cell. But due to multi-path propagation in the radio channel, the UE receives multiple copies of the transmitted signature sequence that have different delays, amplitudes, and phase shifts. There may for example be a direct signal path from the transmitter in the cell and the UE and an indirect reflected signal path that arrives at the UE sometime later. In this case, the cross correlation operation in the UE produces two distinct peaks for the same signature sequence, one per radio path. The UE uses this correlation peak information to perform channel estimation and equalization.

Now consider a second scenario without multi-path, but with two different cells transmitting the same signature sequence. The transmitted signals from the two cells will arrive at the UE with slightly different delays, amplitudes, and phase shifts. The UE performs a cross correlation with the received signal and the output contains two distinct peaks for the same signature sequence, but in this case, one peak per cell. What these two scenarios demonstrate is that the UE can not differentiate between normal multi-path in the radio channel and the same signature sequence being transmitted from two different cells.

Thus, it is desirable to provide an automated approach to resolve cell identifier collisions in an efficient fashion as well as to be able to disseminate changed or new cell identifiers in a seamless, automated, and coordinated fashion.

SUMMARY

The technology described automatically resolves cell identity collisions/conflicts in a cellular radio communications network. A detecting node determines that a first cell identifier associated with a first conflicting cell is the same as a second cell identifier associated with a second conflicting cell. One of the first and second conflicting cells is selected to change its cell identifier. A different cell identifier is determined for the selected cell. The different cell identifier is then provided to other cells and preferably to user equipment (UE) terminals without disrupting ongoing UE communications. For example, a cell identifier change message may be sent to the one or more other cells. That message can include a time parameter from a receiving cell to indicate when to change the cell identifier for the selected cell to the different cell identifier.

The technology may be implemented in one or more radio network nodes. In a preferred example embodiment, the functions are distributed among multiple radio network nodes, where a cell is associated with a base station. The term "cell" is used to refer both to the cell coverage area and to the base station that controls operations in that coverage area. For example, a detecting cell may perform the detecting and selecting tasks, and the selected cell may perform the determining and providing tasks. Moreover, each cell preferably maintains a neighbor cell relations list that includes each cell's identifier along with other information.

The cell identifier collision detecting operation may be facilitated by receiving information from one or more user equipment (UE) terminals regarding transmissions received from the first and second cells including the same cell identifier. Alternatively, the cell identifier collision detecting operation may include receiving information regarding cell identifiers for other cells from other network nodes, e.g., other base stations. The network node may also determine a neighbor cell relations (NCR) information from one or more cells neighboring the selected cell. Based on the NCR information, the network node can determine a different cell identifier that is different from cell identifiers indicated in the NCR information.

A preferred (but not essential) feature relates to locking the non-selected one of the first and second cells to prevent cell identifier information from being changed at the non-selected cell. After the selected cell changes its cell identifier to the different cell identifier, the non-selected cell is unlocked. Additional locking features include detecting that the non-selected cell is already in a locked state, subsequently detecting that the non-selected cell is in an unlocked state, sending a cell identifier locking message to the non-selected one of the first and second cells to prevent cell identifier information from being changed at the non-selected cell, and sending a cell identifier change message to the selected cell. Preferably, a determination is made whether the detected cell identifier conflict was resolved before sending the cell identifier locking message to the non-selected cell.

Another locking feature includes detecting that the selected cell is in a locked state preventing change of cell identifier information for the selected cell, subsequently detecting that the selected cell is in an unlocked state, sending a cell identifier locking message to the non-selected one of the first and second cells to prevent cell identifier information from being changed at the non-selected cell, and sending a cell identifier change message to the selected cell. Again, a determination is preferably made whether the detected cell identifier conflict was resolved before sending the cell identifier locking message to the non-selected cell.

The first and second cell identifiers can be reporting cell identifiers used by the UE terminals to identify cells associated with a reporting parameter provided by the UE terminals in measurement reports sent by the UE terminals to the cellular radio communications network. For example, if the cellular radio communications network is a long term evolution (LTE) network, the first and second cell identifiers can be measuring cell identifiers (MCIs).

If the first and second conflicting cells use the same MCI, then the UE terminals are unable to detect, measure, and report the second conflicting cell in the handover measurements to the first conflicting cell. The reason is that the UEs are unable to differentiate between normal multi-path of the radio channel and "artificial" multi-path caused by several cells transmitting the same MCI/signature sequence signal as explained in the background. To allow the UE to resolve this ambiguity, the first cell broadcasts a transmission gap message at a predefined time in the future. At that time, the first cell does not transmit its MCI/signature sequence, i.e., during the transmission gap, the UE searches for that MCI/signature sequence associated with the first cell. If one of the UEs detects the first cell's MCI/signature sequence during the transmission gap, then the UE knows that the same signature sequence is being transmitted by another cell in the system in addition to the first cell.

In an example transmission gap procedure, the first cell informs one or more served UE terminals about an upcoming MCI/signature sequence its transmission gap and requests that the one or more UE terminal(s) try to detect whether other cells are using the first cell's MCI during that transmission gap. In case the one or more UE terminal(s) detects a different cell using the first cell's MCI during the transmission gap, then they report this back to the first cell. The first cell will then initiate an MCI changing procedure to resolve the MCI conflict.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail.

It will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be embodied in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to a general or special purpose computer capable of executing software code, and may include, without limitation, digital signal processor (DSP) hardware, application specific integrated circuit hardware (ASIC), read only memory (ROM) for storing software, random access memory (RAM), and non-volatile storage.

It will be apparent to one skilled in the art that other embodiments may be practiced apart from the specific details disclosed below. All statements reciting principles, aspects, and embodiments, as well as specific examples, are intended to encompass both structural and functional equivalents. Such equivalents include both currently known equivalents as well as equivalents developed in the future, i.e., any elements developed that perform the same function, regardless of structure.

Figure 1:
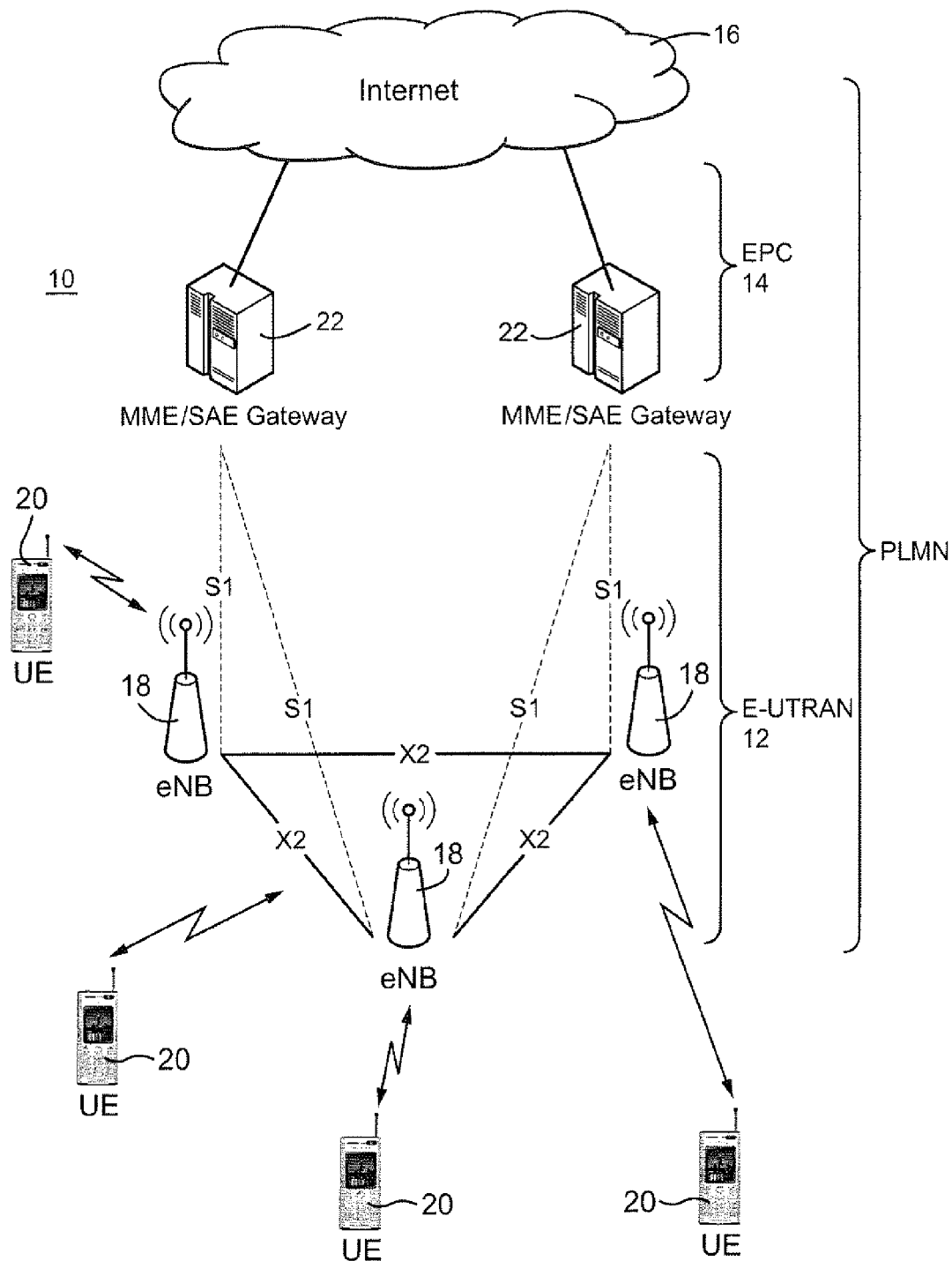
FIG. 1 a block diagram of an example LTE mobile radio communications system.
Figure 2:
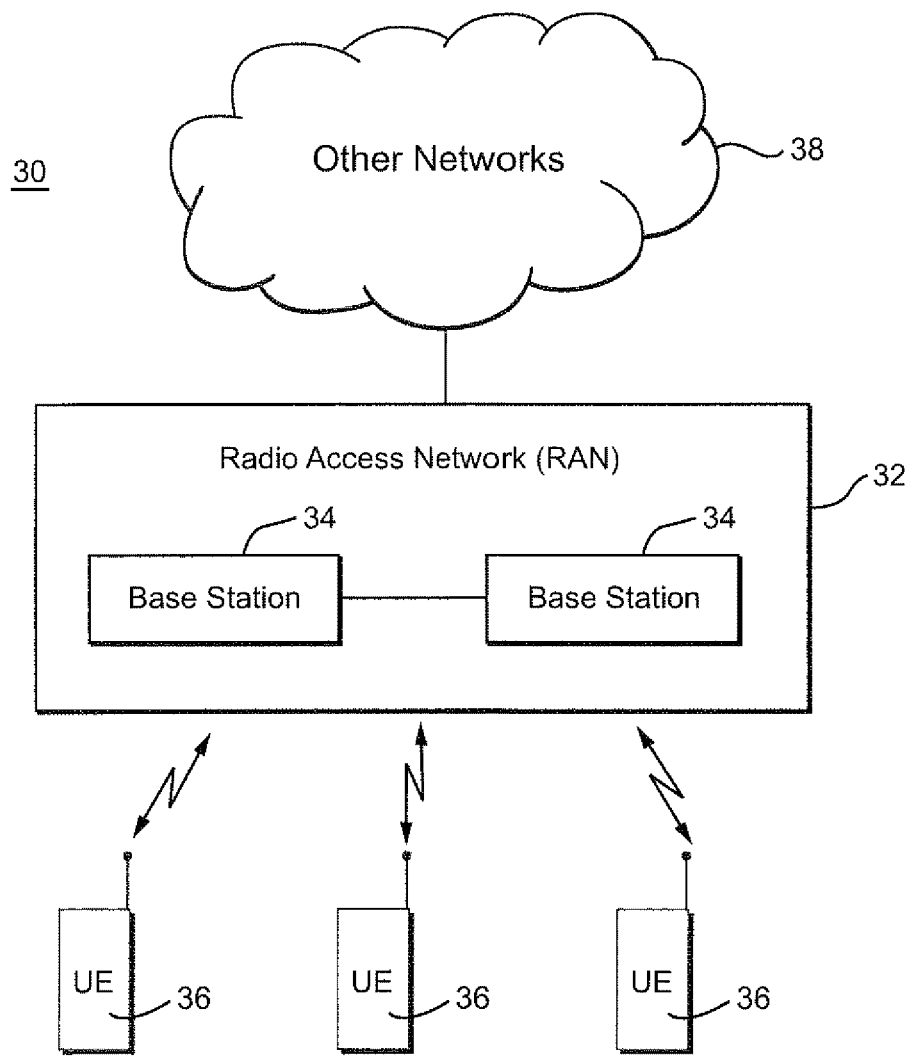
FIG. 2 a block diagram of an example more general RAN mobile radio communications system.

The technology is described in the context of an evolved 3GPP UMTS system, such as LTE, in order to provide an example and non-limiting context for explanation. But this technology may be used in any modern cellular communications system that supports cell identification. One non-limiting example of a general cellular communications system 30 is shown FIG. 2. A radio access network (RAN) 32 is coupled to one or more other networks 38 such as one or more core network nodes and one or more external networks such as the public switched telephone network (PSTN) and the Internet. The RAN 32 includes base stations 34 that communicate with each other, e.g., for handover and other coordinated functions. The base stations communicate over the radio/air interface with mobile radio terminals also referred to as user equipment terminals (UEs) 36. Although an MCI is used in the LTE context as an example of a cell identifier, the technology described here may be applied to any cell identifier.

Figure 3:
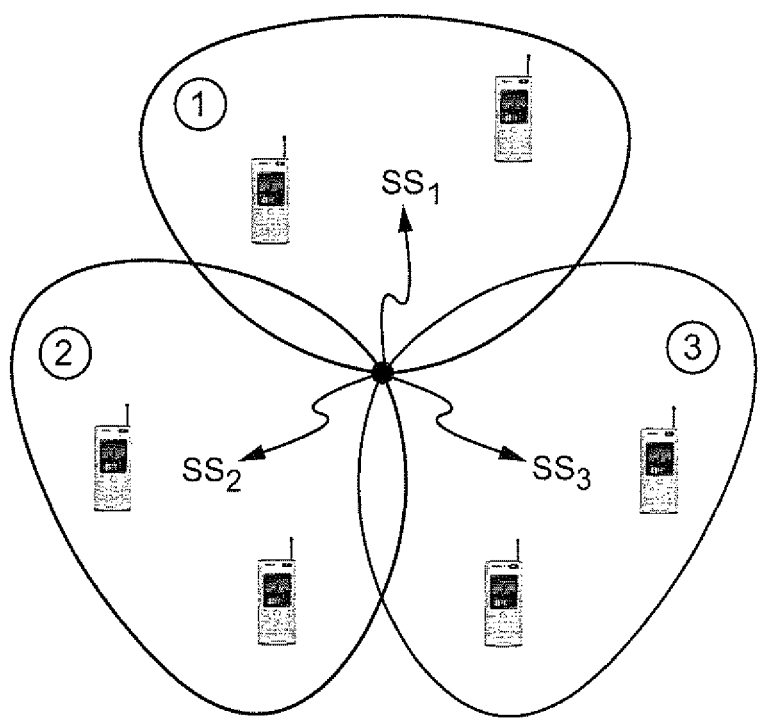
FIG. 3 is a diagram illustrating an example base station serving multiple cells and broadcasting a corresponding cell signature sequence in each cell area.

As described above, each base station broadcasts a predetermined "signature sequence" or other identifier over a known frequency that may be detected by UEs scanning for such base station broadcasts in a cell area associated with the broadcast. The term "cell" refers to the geographical area where an associated base station or eNB provides UEs radio service. But a cell is also sometimes used as a shorthand way of referring to the base station or eNB associated with that cell. Each signature sequence, which is detectable by UEs, is mapped to a relatively short cell identifier that is used by the UEs when sending back frequent measurement reports to a serving cell. FIG. 3 shows an example base station serving three cells 1-3. Each cell transmits its own signature sequence. Other base stations may only have one cell or a different number of cells. Regardless, each cell's own signature sequence is mapped to a corresponding, relatively short cell identifier. It is typically these shorter, reporting or measurement cell identifiers that are subject to collisions, although the technology described may be used to resolve any cell identifier collision or conflict. A longer, more unique cell identifier may also be mapped to the short cell identifier/cell signature sequence.

Figure 4A:
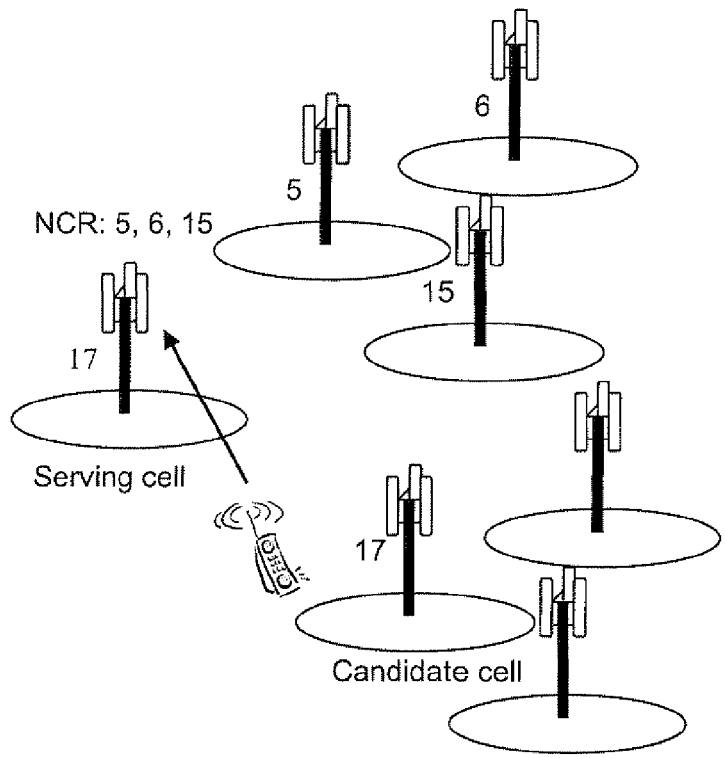
FIGS. 4A-4C illustrate example cell identifier collision situations.
Figure 4B:
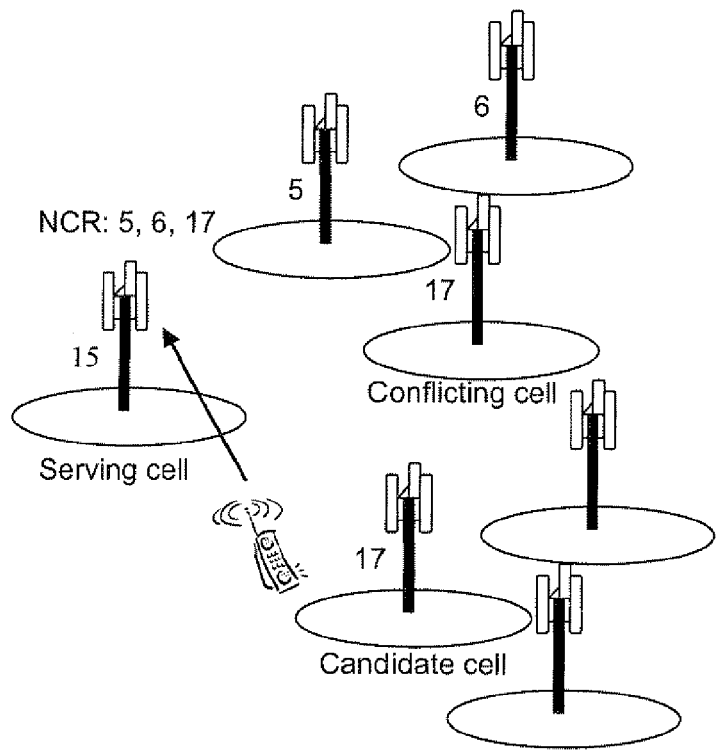
Figure 4C:
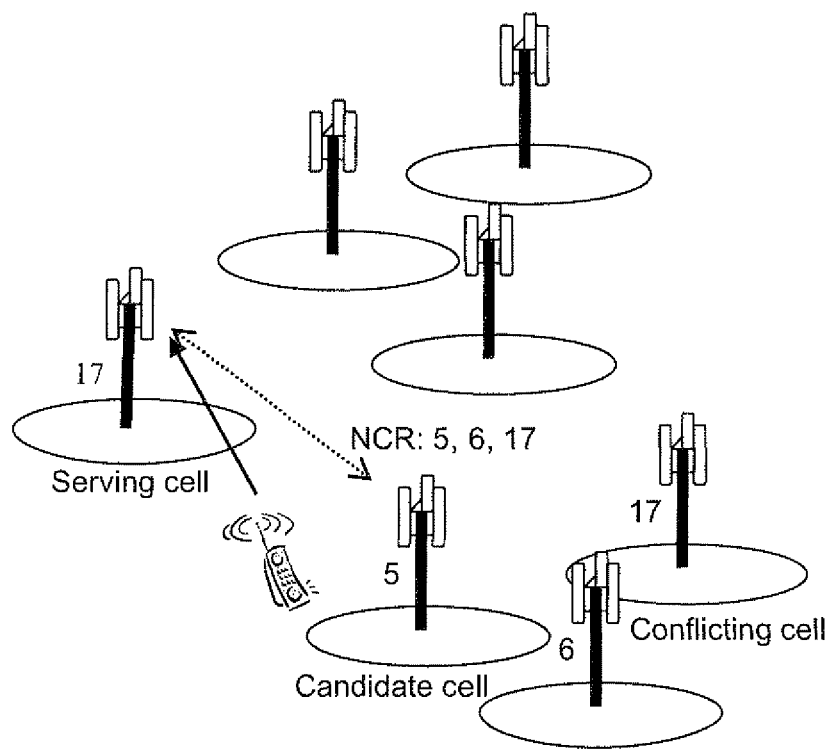

FIG. 4 illustrates three non-limiting example reporting or measurement cell identifier collision situations. When a collision is detected, the detecting cell determines which of the conflicting cells will change its MCI. In FIG. 4A, a nearby cell for the UE shown in the figure has the same MCI=17 as a serving cell currently serving the UE. The serving cell has a neighbor cell relation ACR) that includes cells with MCIs of 5, 6, and 15. In this case, the UE terminal may not be able to detect, measure, and report the candidate cell with MCI=17 to the serving cell because its MCI is the same as the serving cell. Instead, the nearby cell can be detected if the serving cell effects a transmission gap during which it does not broadcast its MCI/signature sequence, during that gap, the UE terminals in that serving cell can detect if nearby cells are using the same MCI as the serving cell. Upon such detection, the UE9s) inform the serving cell, and at that point, the serving cell is both the detecting cell and one of the conflicting cells. FIG. 4B shows the candidate cell with the same MCI (MCI=17) as "one" cell in the serving cell neighbor cell relation (NCR) list including MCIs of 5, 6, and 17, but a different CIPL. The detecting cell is the serving cell (MCI=15), and the candidate cell and the one cell in the serving cell's NCR list including MCIs of 5, 6, and 17 are conflicting cells. FIG. 4C illustrates the serving cell aiming to add the candidate cell (MCI=5) to its NCR list, but the candidate cell detects an MCI conflict as a result of the new mutual relation because the serving cell's MCI already exists for "one" cell in the candidate cell's NCR list including MCI's of 5, 6, and 17. The detecting cell is the candidate cell, and the conflicting cells are the serving cell and the one cell in the candidate NCR list.

Figure 5:
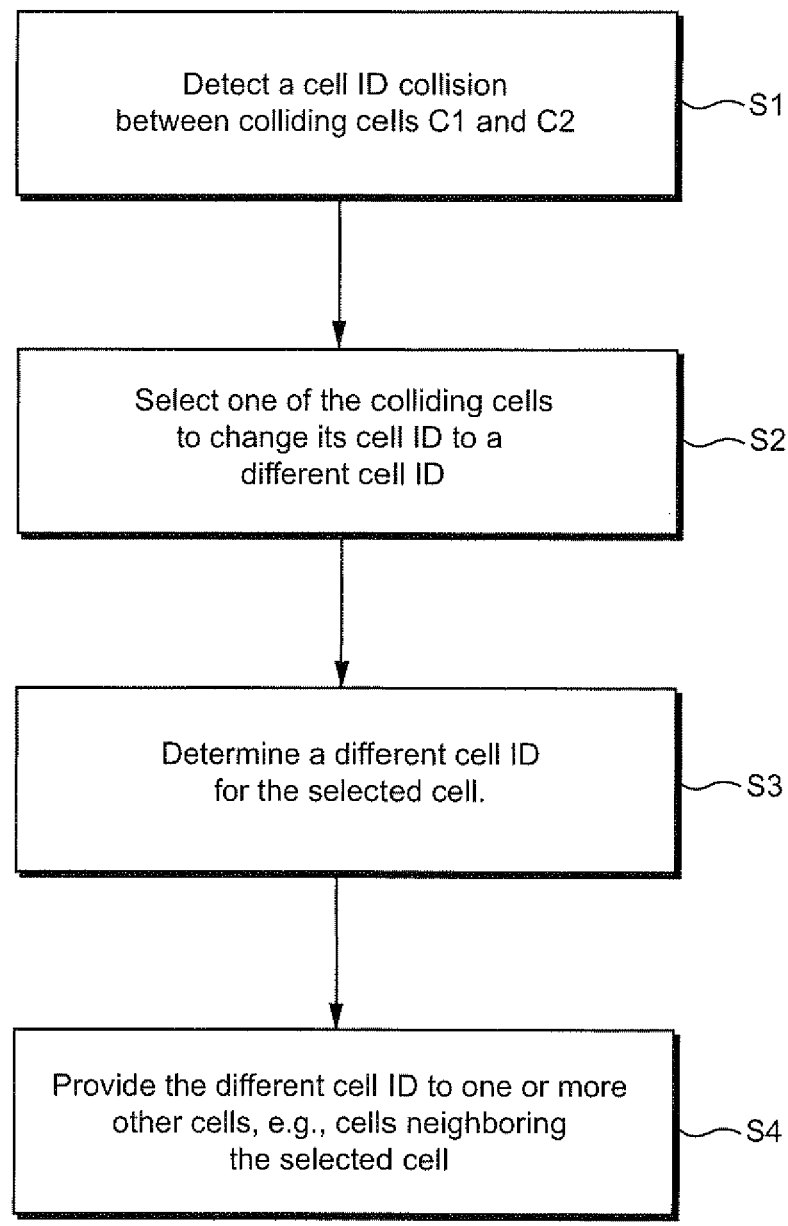
FIG. 5 is a flowchart diagram illustrating non-limiting, example procedures for automatically resolving a cell identifier collision.

FIG. 5 is a flowchart diagram illustrating non-limiting, example procedures for automatically resolving a cell identifier collision. In step S1, a cell identifier collision is detected between colliding cells C1 and C2. One of the colliding cells C1 or C2 is selected to change its cell identifier to a different cell identifier (step S2). A different, hopefully non-colliding cell identifier is determined for the selected cell (step S3). The different cell identifier is provided to one or more other cells, e.g., cells neighboring or in the vicinity of the selected cell (step S4). The different cell identifier is also preferably provided to UE terminals monitoring the selected cell.

One non-limiting and example way to detect a collision is now described. Each measurement report from a UE contains information about at least one handover cell candidate including that candidate cell's MCI. If one or more certain conditions are met, the serving cell may order a UE to determine and report a CIPL corresponding to a reported MCI. Non-limiting examples of such condition(s) include a handover failure ratio is above a threshold for a neighbor with a certain MCI, a periodic MCI check timer has expired, or a central node has ordered CIPL measurements for all or selected handovers, etc. Each cell candidate in the report is processed according to the following. A determination is made whether the MCI of the candidate cell is a member of the serving cell NCR list. If it is, a determination is made whether the CIPL of the alternative cell and the NCR list entry are the same. If so, a handover decision procedure is initiated. Otherwise, the MCI collision must be resolved. If the MCI of the candidate cell is not a member of the serving cell NCR list, then the candidate cell is considered as an NCR list candidate. A message is then sent over an appropriate interface (e.g., X2 or S1) proposing a mutual neighbor relation between the two cells. If the candidate cell confirms the proposed NCR list update, then the candidate cell is added to the NCR list, relevant information about the cell is stored, and a handover decision procedure is initiated. If the candidate cell does not confirm the proposed NCR list update due to an MCI conflict in the candidate cell NCR list addition procedure, then initiate a candidate cell MCI collision resolution procedure is initiated.

If a collision is detected, then the detecting cell determines which cell out of the conflicting cells that will change MCI. For example, the detecting cell may select the conflicting cell that needs to change MCI using on one or more of the following guides: the conflicting cell with the lowest CIPL will change MCI, the conflicting cell with the shortest NCR list will change MCI, the conflicting cell that most recently changed MCI will change MCI, the youngest cell will change MCI, the cell with the lowest cell type will change MCI, and/or the cell using a smallest maximum power will change MCI. One or more other selecting parameter(s) may be used. Indeed, the selection may even be random.

Figure 6:
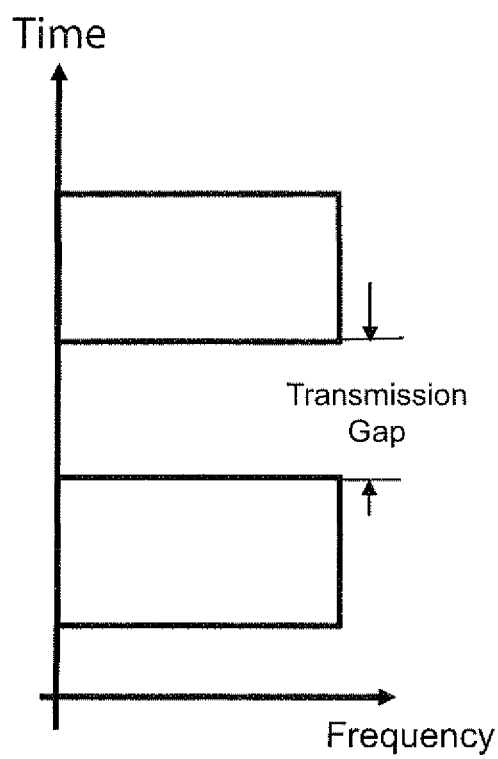
FIG. 6 illustrates conceptually a transmission gap.

MCI conflicts where the serving cell is one of the conflicting cells cannot be detected just by the serving cell receiving handover measurements from served UEs. But such MCI conflicts with the serving cell may be detected by a third cell which detects the MCI conflict based on handover measurements and NCR list management in the third cell as described above. Alternatively, the serving cell may observe one or more transmission gaps during which it avoids transmission of its MCI/signature sequence. An example gap is conceptually illustrated in FIG. 6. The gap may be a configurable time sufficient to allow UE terminals to detect other cells using the serving cell's MCI. The transmission gap may be triggered by a node as part of network management tasks or at random, preferably using a cell specific seed (e.g. based on CIPL), to avoid conflicting cells from performing transmission gaps at the same time. Alternatively, a gap may be triggered based on observations of unexpected behavior for a particular cell, e.g., dropped calls, poorer radio conditions downlink as compared to the uplink, etc. Transmission gaps are preferably synchronized with UE MCI measurements.

Figure 7:
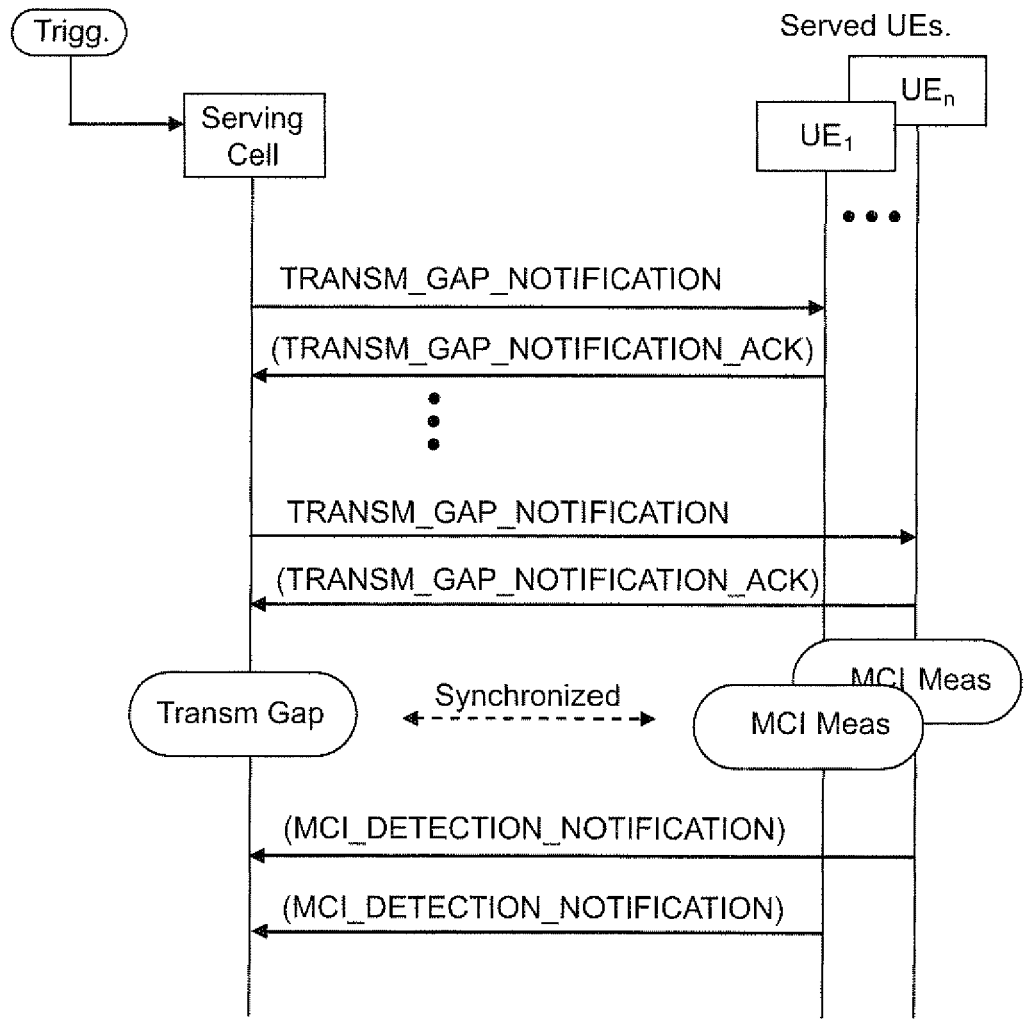
FIG. 7 is a signaling diagram illustrating non-limiting, example signaling messages for issuing transmission gaps.

One example signaling diagram that implements the transmission gap MCI measurement is shown in FIG. 7. A TRANS_GAP_NOTIFICATION message is sent to served UEs by the serving cell which preferably return acknowledgement messages. During the transmission gap, the notified UEs make MCI measurements. Thereafter, the UEs each send an MCI_DETECTION_NOTIFICATION message to the serving cell that contains information regarding any MCI conflict detected between the serving cell MCI and an MCI from neighboring cells.

Figure 8:
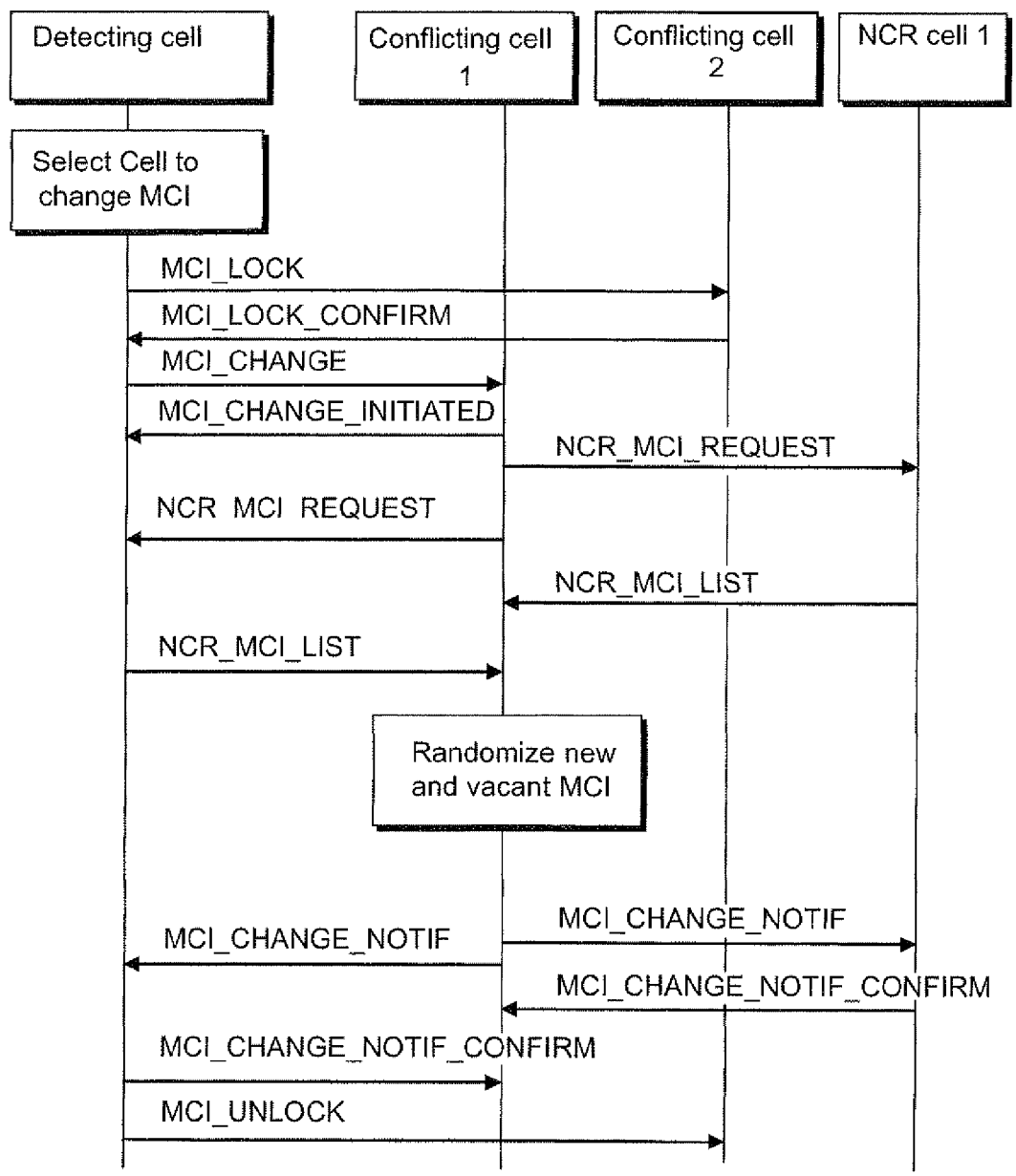
FIG. 8 is a signaling diagram illustrating non-limiting, example signaling messages for automatically resolving a cell identifier collision and seamlessly changing a cell identifier in accordance with a first non-limiting, example embodiment.

FIG. 8 is a signaling diagram illustrating non-limiting, example signaling messages for automatically resolving a cell identifier collision and seamlessly changing a cell identifier in accordance with a first non-limiting, example embodiment. In this example, a database type lock is used because multiple base station cell entities can potentially concurrently access each cell's database or table listing MCI information. Although MCI changes may performed without such locking, locking prevents MCI data from being corrupted or invalidated when multiple cell entities try to write to a cell's database at the same time. Any single cell entity can only modify MCI information stored in the database to which it has applied a lock that gives it exclusive access to the stored MCI information until the lock is released. Hence, the first message from the detecting cell entity in Figure is an MCI_LOCK message sent to non-selected conflicting cell 2 that locks cell 2 for MCI changes by other cells. Conflicting cell 2 confirms the lock with an MCI_LOCK_CONFIRM message.

Figure 9:
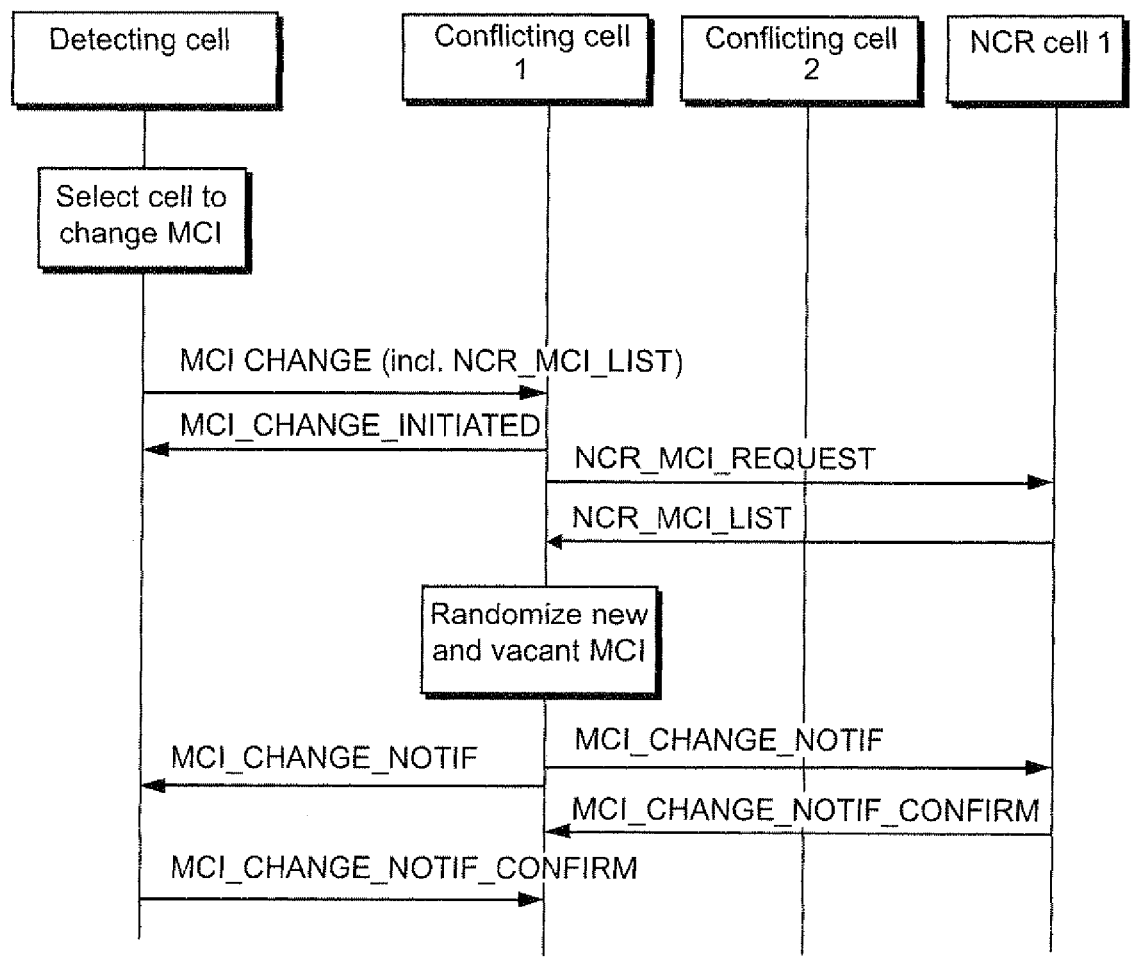
FIG. 9 is a signaling diagram illustrating non-limiting, example signaling messages without locking procedures where the MCI list of entries in the serving cell NCR list are included in an initial MCI change message.

The detecting cell then sends to selected conflicting cell 1 a MCI_CHANGE message requesting that cell 1 change its MCI. The MCI_CHANGE message includes the currently used MCI by this conflicting cell 1 so that cell 1 can detect inconsistencies. Example of such inconsistencies include situations when the MCI change information signaling fails or information about previous changes has not yet been communicated to all affected nodes. If the selected cell 1 is able to change its MCI, initiation of changing that MCI is confirmed by the conflicting cell 1 returning a MCI_CHANGE_INITTATED message. The selected conflicting cell 1 determines a set of locally-occupied MCI's by requesting the set of MCI's in the neighbor cell lists of its neighbor cells. The request may be made by sending a NCR_MCI_REQUEST message to cells in cell 1's neighbor cell list. For this simple example, only neighbor cell relation (NCR) cell 1 is in that neighbor cell list. The NCR cell(s) respond with a list of MCI's corresponding to cells in their neighbor cell list in an NCR_MCI_LIST message. The detecting cell also receives the NCR_MCI_REQUEST message from the conflicting cell 1 and responds with its NCR_MCI_LIST. Alternatively, the detected cell may include its NCR MCI list in the initial MCI_CHANGE message instead. The non-limiting, example signaling diagram in FIG. 9 described below, which is similar to that in FIG. 8 but without a locking procedure illustrates an initial MCI_CHANGE message that includes the MCI list of entries in the serving cell NCR list.

The NCR_MCI_LIST response message is a list of neighbor cells with one or more of the following parameters for each neighbor cell: CIPL, MCI, maximum power, cell type, number of neighbor cells, time the cell was taken into traffic, time the cell was last changed, etc. If one of the conflicting cells has already initiated an MCI changing procedure, the detecting cell is aware of that because it has received the NCR_MCI_REQUEST message from that initiating cell. In that case, the detected cell may consider the MCI conflict as being solved or at least in the process of being solved.

Given the locally conflicting MCI's, the selected conflicting cell 1 selects a new MCI among locally vacant MCI's. In order for the selected cell 1 to determine which MCIs that are locally vacant, it contacts the neighboring cells listed in its NCR list and asks for all MCIs listed in their corresponding NCR lists. The union of the MCI lists obtained from neighboring cells defines a set of locally conflicting MCIs for cell 1. Thus, a locally vacant MCIs for cell 1 is any valid MCI that is not in the list of locally conflicting MCIs for cell 1.

Any locally vacant MCI can be used, and a random MCI selection is shown as a non-limiting example. In case the MCIs are ordered into different groups, the selection of a new MCI among the vacant MCIs may be restricted to a certain MCI within the same MCI group. As an example, in LTE the MCIs are organized into 3 groups that correspond to the same two-dimensional time-frequency pattern, and 170 identities within each group correspond to different pseudo random sequences. The selection of the new MCI may also be restricted to belong to an MCI group other than the old conflicting one.

As described in the related application referred to above, the new MCI is broadcast to cells in the neighbor cell list of the selected conflicting cell 1 using an MCI_CHANGE_NOTIF message and to UE's being served by the selected conflicting cell. The message contains (at least) the new MCI and possibly also information about when the new MCI will be put into use. Each of those NCR base stations then preferably responds with an MCI_CHANGE_NOTIFICATION_CONFIRM message to acknowledge receipt of the MCI_CHANGE_NOTIFICATION message. This acknowledgement message is not necessary. Such messages may contain an absolute future time reference or a count-down time value so the NCR base stations change at the same time or approximately at the same time. The MCI change notification message may be sent over the X2 or the S1 interface to a neighboring base station. When the detecting cell receives the MCI_CHANGE_NOTIF message, it also releases the lock of the non-selected conflicting cell using an MCI_UNLOCK message. Similar MCI change messages may be sent to the UEs being served by the selected cell. In this way, the MCI change may be accomplished seamlessly, automatically, and in real time with interrupting ongoing UE connections.

Figure 10A:
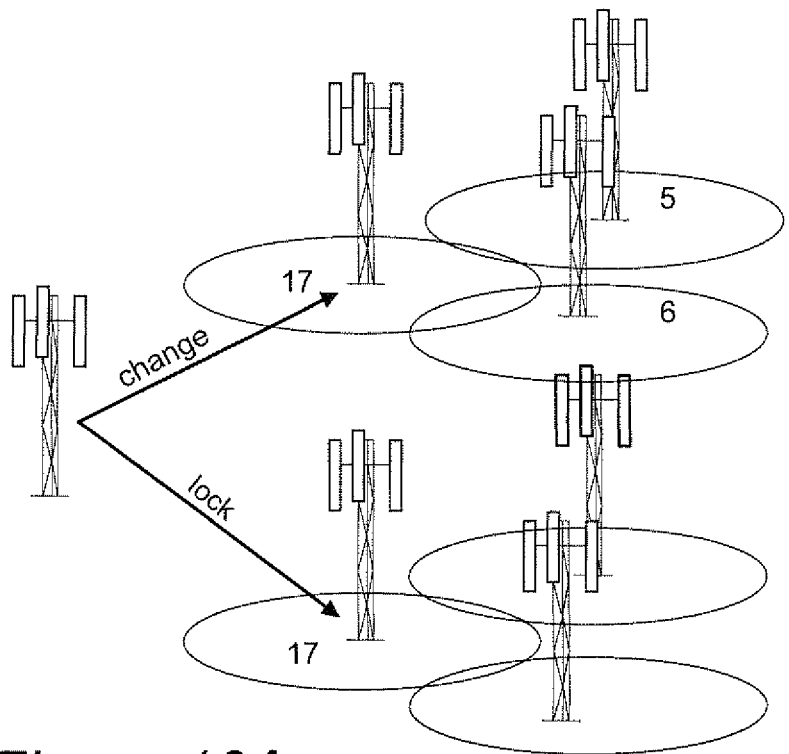
FIGS. 10A-10D illustrate an example cell identifier collision resolution.
Figure 10B:
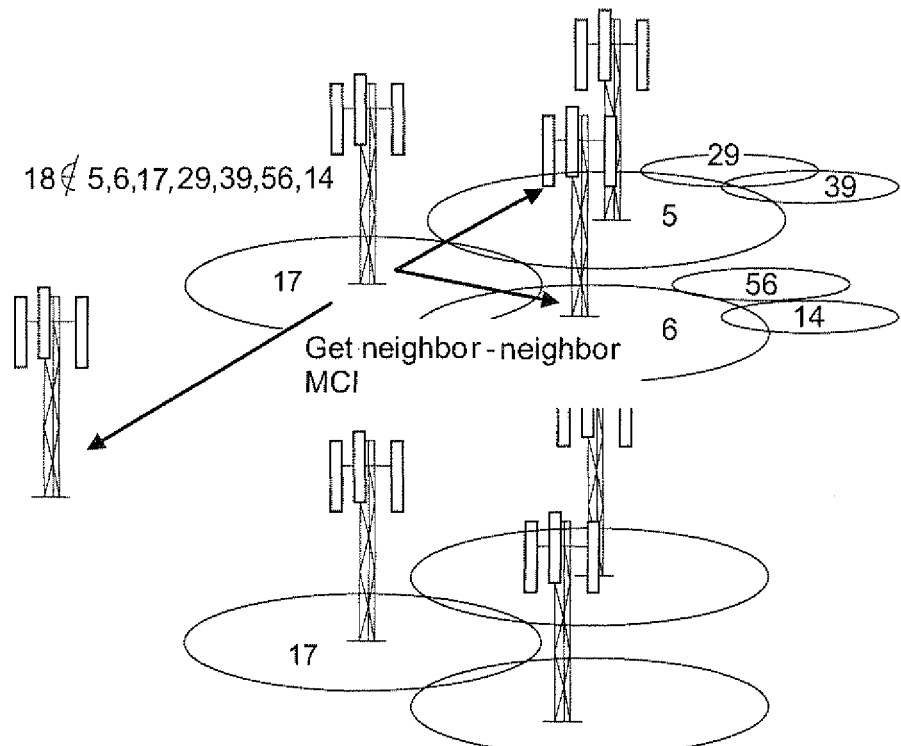
Figure 10C:
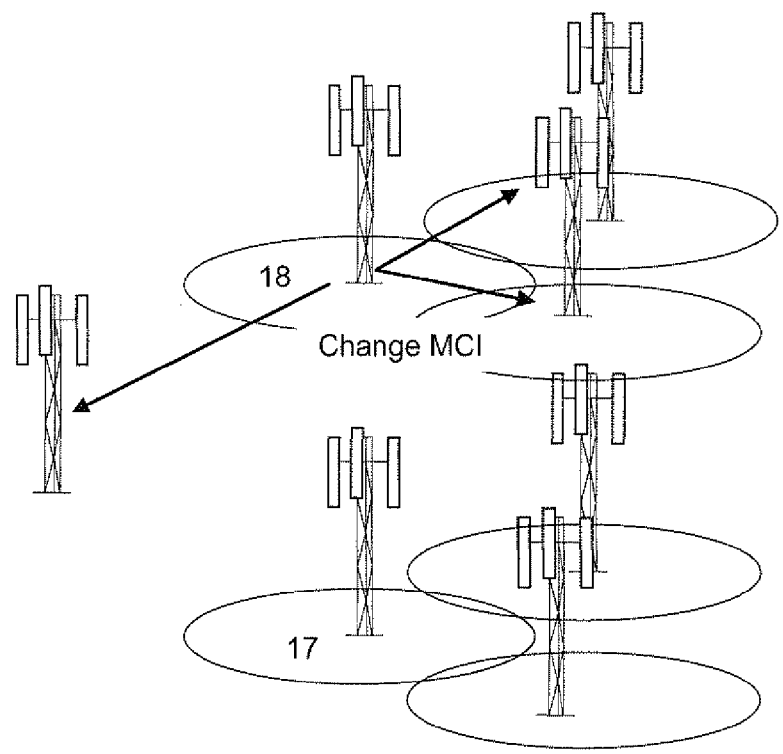
Figure 10D:
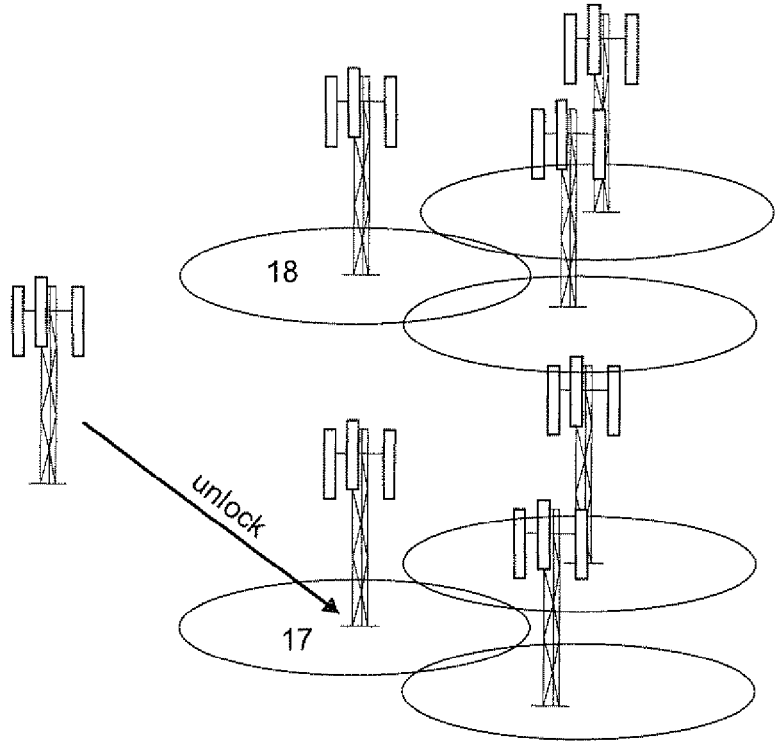

FIGS. 10A-10D illustrate an example of a cell identifier collision resolution. FIG. 10A illustrates an example where the detecting cell locks the candidate cell with an MCI=17 and changes the MCI of the neighboring cell in the detecting cell's NCR list. In FIG. 10B, the changing cell obtains the MCIs of neighboring cells from its NCR list, which include 5, 6, 29, 39, 56, and 14, and determines that MCI=18 is vacant. Then in FIG. 10C, the changing cell selects vacant MCI=18 and sends an MCI change notification message with its new MCI=18 to the detecting cell and to its neighbor cells in its NCR list. The detecting cell then sends an unlock message to the non-selected conflicting cell in FIG. 10D.

There is a risk that the initial lock request from the detecting cell to the non-selected conflicting cell C2 is rejected. One reason is that the cell is already in the process of changing MCI, but the detected cell is unaware (has not yet received the NCR_MCI_REQUEST message). Another is that the cell is locked for MCI changes. In the first case, the detected cell considers the conflict to be solved. But in the second case, the detected cell should wait for the non-selected conflicting cell, which is locked, to be unlocked.

Figure 11:
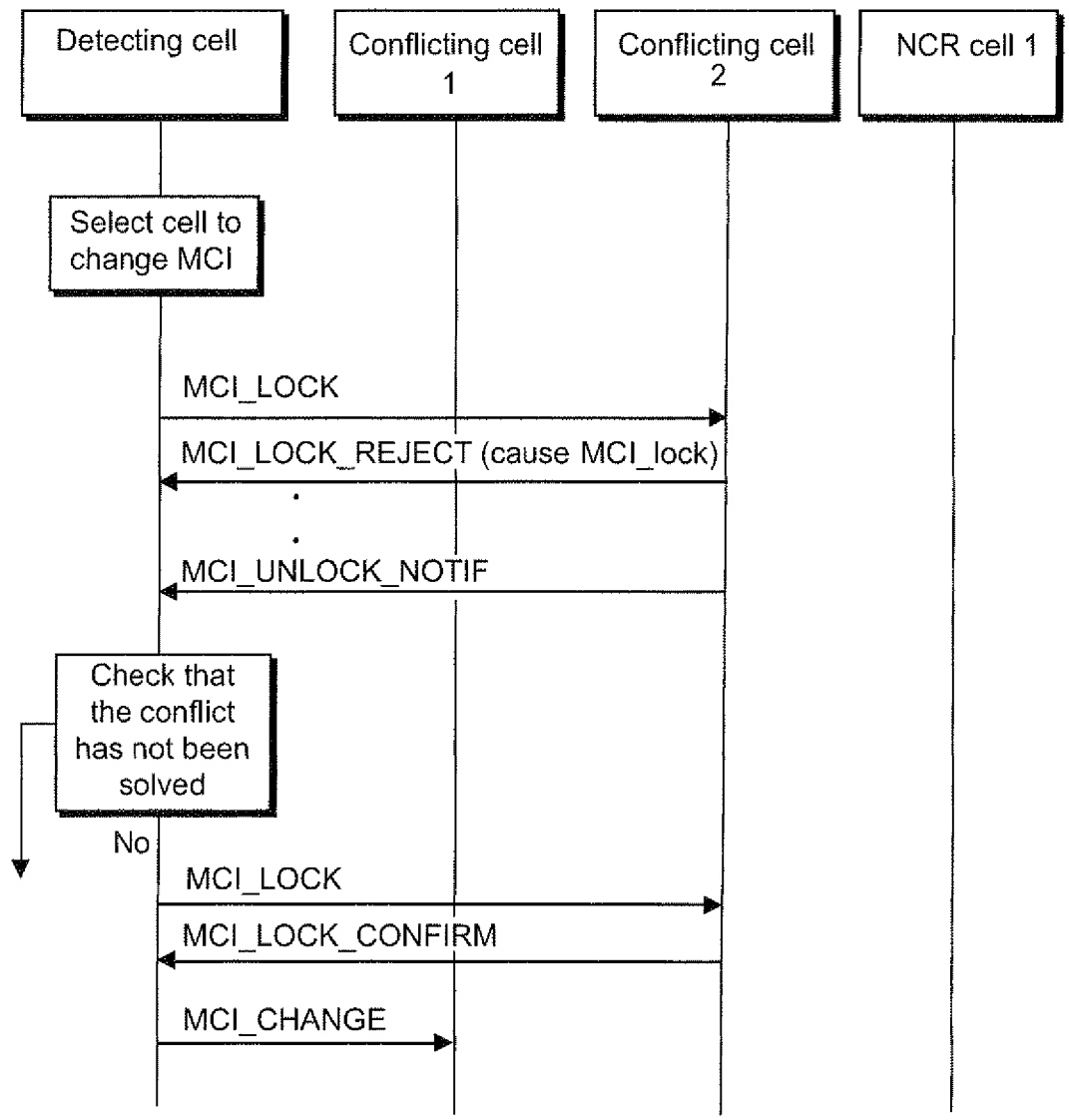
FIG. 11 is a signaling diagram illustrating non-limiting, example signaling messages for automatically resolving an MCI collision when a non-selected conflicting cell rejects an MCI lock request due to a pending MCI lock.

FIG. 11 is a signaling diagram illustrating non-limiting, example signaling messages for automatically resolving an MCI collision when a non-selected conflicting cell rejects an MCI lock request due to a pending MCI lock. The detecting cell tries to lock the non-selected conflicting cell 2 by sending an MCI_LOCK message. But because the non-selected conflicting cell 2 is already locked, it sends an MCI_LOCK_REJECT message back to the detecting cell. When the non-selected conflicting cell 2 is released, it sends an MCI_UNLOCK_NOTIF message to let the detecting cell know that it is now unlocked. The detecting cell checks to see whether the MCI collision has been resolved. If not, it sends an MCI_LOCK message to the non-selected conflicting cell 2 which returns an MCI_LOCK_CONFIRM message. The MCI of the selected conflicting cell 1 is then changed as described above, for example. Alternatively, a cell may obtain and accept several locks from other cells, and this cell rejects MCI_CHANGE messages until all locks have been released. Furthermore, each MCI_LOCK message may have an expiration time to prevent deadlock.

Figure 12:
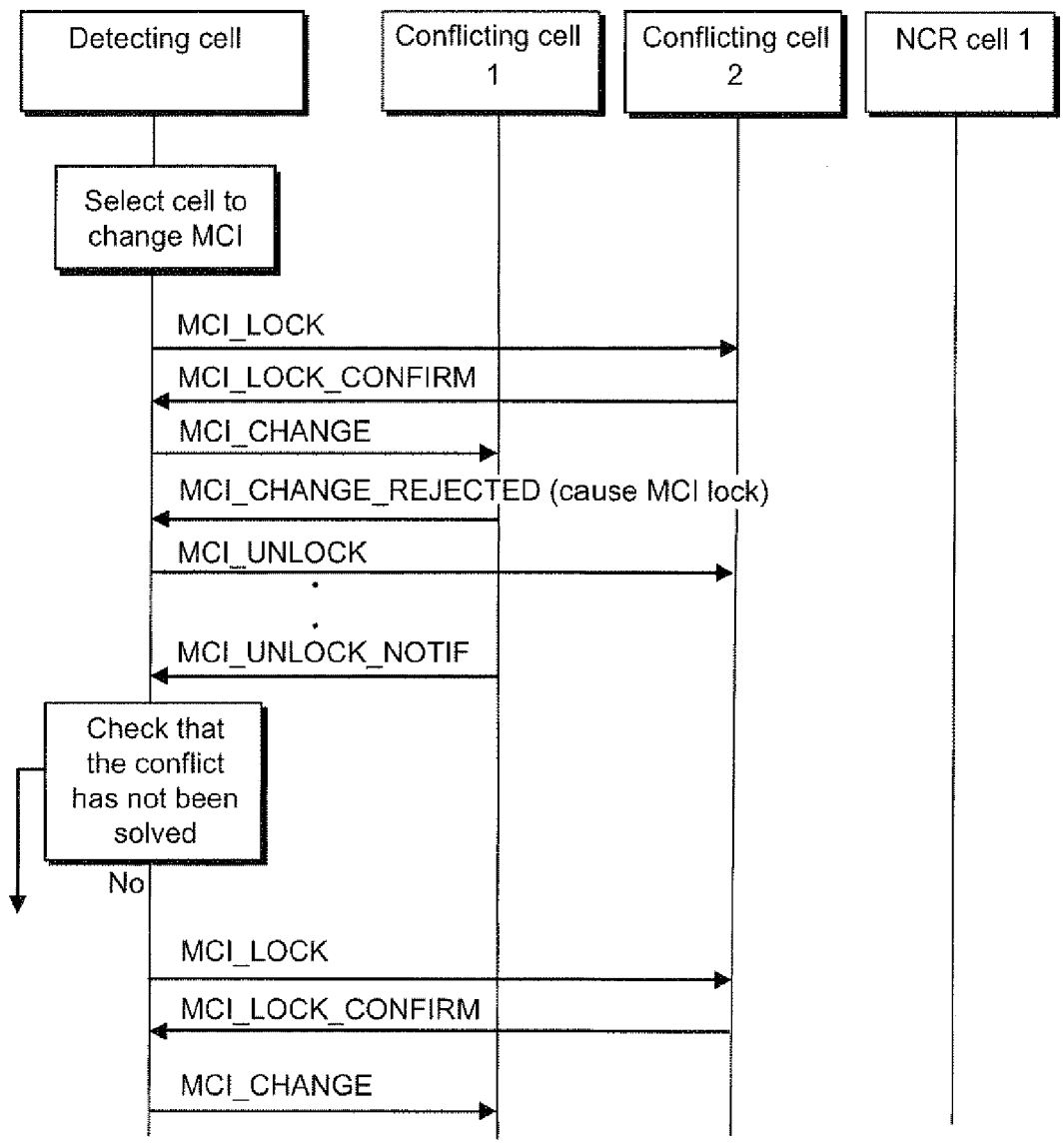
FIG. 12 is a signaling diagram illustrating non-limiting, example signaling messages for automatically resolving an MCI collision when a selected conflicting cell rejects an MCI lock request due to an MCI lock.

Similarly, it is also possible that the selected conflicting cell C1 rejects the request to change MCI. One reason is that the cell is already in the process of changing MCI, but the detected cell is unaware. Alternatively, the cell is locked for MCI changes. In the first case, the detected cell may consider the conflict solved. But in the second case, the detected cell must wait for the selected conflicting cell C2 to be unlocked. FIG. 12 is a signaling diagram illustrating non-limiting, example signaling messages for automatically resolving an MCI collision when the selected conflicting cell rejects an MCI lock request due to an MCI lock. The detecting cell locks the non-selected conflicting cell 2 with an MCI_LOCK message and receives lock confirmation. An MCI_CHANGE message is then sent to the selected conflicting cell C1, but that request is rejected via an MCI_CHANGE_REJECTED message because the selected conflicting cell 1 is locked. Accordingly, the non-selected conflicting cell C2 is unlocked. When the detecting cell later receives an MCI_UNLOCK_NOTIF message from the selected conflicting cell C1, it checks to determine whether the MCI conflict was resolved. If not, it sends an MCI_LOCK message to the non-selected conflicting cell C2 to lock, and after receiving lock confirmation, the detecting cell sends an MCI_CHANGE message to the selected conflicting cell C1.

Figure 13:
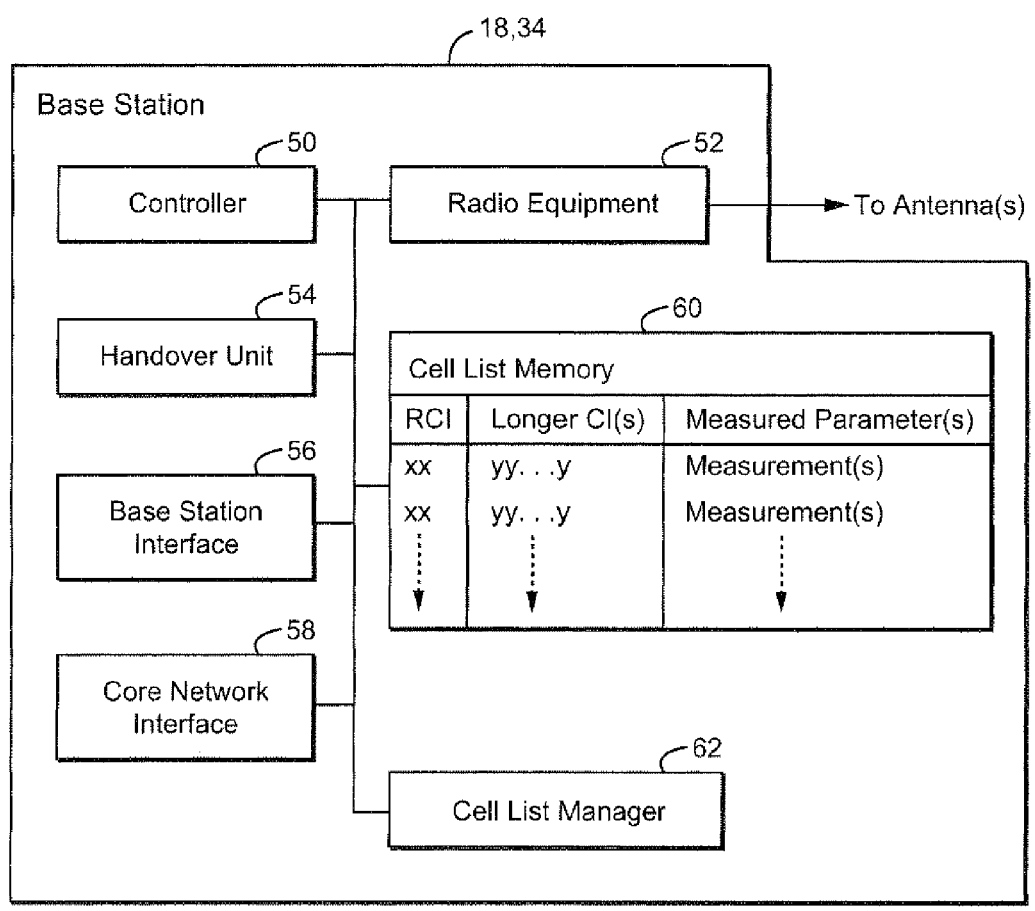
FIG. 13 is a function block diagram illustrating a non-limiting, example base station.
Figure 14:
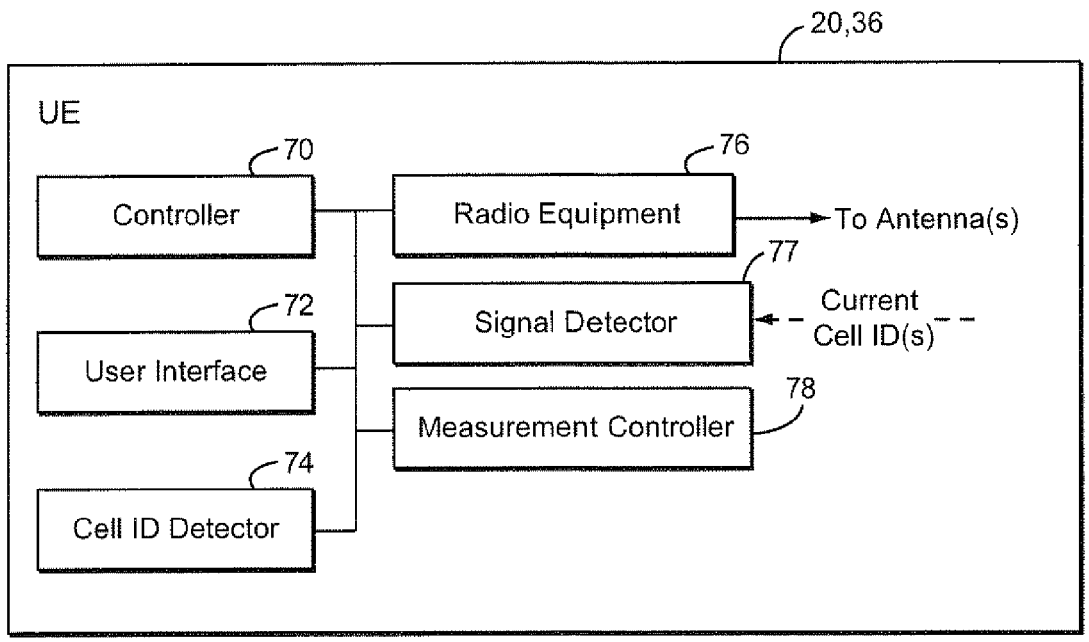
FIG. 14 is a function block diagram illustrating a non-limiting, example UE terminal.

FIGS. 13 and 14 are function block diagrams of a non-limiting example base station and UE terminal, respectively, that may be used to implement one or more aspects of this technology. The base station 18, 34 in FIG. 13 includes a controller 50, radio equipment 52 coupled to typically multiple antennas, a handover control unit 54, a base station communications interface 56, a core network communications interface 58, a cell list memory 60, and a cell list manager 62. The controller 60 supervises the overall operation of the base station, and the other blocks perform their associated base station functions. The cell list manager 62 builds and updates a neighboring cell list for this base station, e.g., an NCR list. The cell list memory 60 provides a mapping between a cell's relatively short, reporting cell identifier (RCI), e.g., an MCI, the cell's longer cell identifier, e.g., a CIPL, and other parameters associated with that neighboring cell. Non-limiting examples of such parameters include capabilities of the neighboring cell, connectivity information such as IP address and X1/S1 interface configurations, parameters related to handover (e.g., threshold values, filter parameters, timer values), performance measurement data (e.g. number of successful handovers and total number of handover attempts), or other measurements provided by UEs sending measurement reports to the base station (e.g. downlink signal strength or quality). The cell list manager 62 also performs the operations described above for detecting and resolving cell identifier collisions. Regarding collision detection, another option is that the cell list manager 62 may receive information regarding cell identifier collision from one or more UEs.

The UE terminal 20, 36 in FIG. 14 includes a controller 70, radio equipment 76 coupled to one or more antennas, a signal detector 77, a user interface 72, a measurement controller 78 for measuring signal strength or signal quality of serving and neighboring base station cells, a cell list memory 80, and a cell identifier detector 74. The controller 70 supervises the overall operation of the UE terminal, and the other blocks perform their associated UE terminal functions. The cell identifier detector 74 determines from transmissions from base station cells the cell identifier associated with each transmission so that measurement reports provided to a serving base station include both a cell identifier and one or more measurement parameters. The cell identifier detector 74 may also determine when the UE receives the same cell identifier from two (or more) cells and provide cell identifier collision information to the network. Although not necessary, the UE may also store and update the UE terminal's neighboring cell list in memory which provides a mapping between a cell's relatively short, reporting cell identifier (RCI), e.g., an MCI, the cell's longer cell identifier, e.g., a CIPL, and one or more measured parameters associated with that neighboring cell detected, measured, or otherwise provided by UEs sending measurement reports to the base station, e.g., downlink signal strength or quality, etc. Current trends in LTE are for the UE not to store a neighbor cell list, and instead, let the network store that information. The signal detector 77 receives current cell identifier information (shown conceptually with a dashed line) to permit detection of the information transmitted from the associated base station based on that current cell identifier information.

Figure 15:
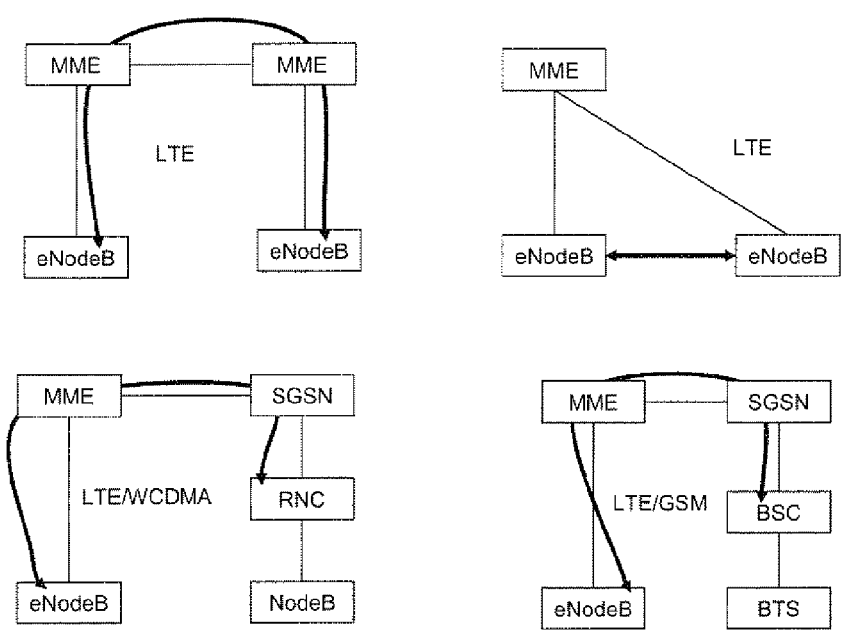
FIG. 15 is a diagram illustrating non-limiting, example signaling routes.

Given that cell identifier collision detection, resolution, and change notification messages are distributed to multiple base stations, those messages sent between the cells may travel different paths depending on the technology. FIG. 15 shows some non-limiting examples. With LTE, the messages may travel over the X2 interface, and if that is not possible, over the S1 interface. For an Inter-Radio Access Technology (IRAT) case, the message must travel via the MME and serving GPRS support node (SGSN) to the final controller (e.g., a BSC or an RNC). An alternative to IRAT is that LTE informs an operational support system (OSS) about an MCI change. The OSS can then execute the necessary change via a management interface.

This technology provides automatic resolution of cell identifier collisions, which reduces the burden for network operators and also improves service to end users. Cell identifier planning for new cell may also be eliminated for new cells because even though a new cell might introduce a cell identifier collision, it is resolved immediately. Other cells and UE terminals may be automatically notified ahead of time of cell identifier changes to ensure seamless and uninterrupted service.

Although the above description is based on the technology being implemented in base stations, some of the cell identifier collision detection and cell identifier change notification functions may be implemented in other network nodes if appropriate such as a radio network controller or even a core network node rather than the base station. Alternatively, the technology could be implemented using some combination of network nodes, e.g., divided between a base station and a radio network controller. All of the illustrated signaling messages should be seen as conceptual and can be implemented in numerous ways. For example, all signaling could be implemented as one generic MCI conflict resolution message with different content.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for use in a cellular radio communications network including previously-operational cells, wherein a need is detected for a cell identifier associated with one of the previously-operational cells in the cellular radio communications network that is already supporting one or more UE call connections, comprising:
   a node associated with the one previously-operational cell determining neighbor cell relations (NCR) information from one or more cell(s) neighboring the one previously-operational cell;
   based on the NCR information, the node determining a cell identifier for the one previously-operational cell that is different from cell identifiers indicated in the NCR information;
   the node providing the different cell identifier to another cell different from the one previously-operational cell; and
   the node informs one or more user equipment terminals (UEs) of a discontinued transmission time period during which the one or more UEs can measure received signals from other cells in order to detect whether the cell identifier for the one previously-operational cell is received.

2. The method in claim 1, wherein the node receives and uses information from at least one other node to perform one or more of the steps in claim 1.

3. The method in claim 1, further comprising receiving information from one or more user equipment (UE) terminals regarding transmissions received from multiple cells including the same cell identifier.

4. The method in claim 1, wherein the NCR information includes information regarding cell identifiers for cells different from the one previously-operational cell.

5. The method in claim 4, wherein the cell identifiers for cells different from the one previously-operational cell are each associated with a corresponding signature sequence.

6. The method in claim 1, further comprising:
   detecting that a first cell identifier associated with a first cell is the same as a second cell identifier associated with a second cell, and selecting one of the first and second cells to be the one previously-operational cell and to change its associated cell identifier.

7. The method in claim 6, wherein a cell identifier change message sent to a cell neighboring the selected cell includes a time parameter from a receiving cell to indicate when to change the corresponding cell identifier for the selected cell to the different cell identifier.

8. The method in claim 6, further comprising:
locking the non-selected one of the first and second cells to prevent cell identifier information from being changed at the non-selected cell, and
after the selected cell has changed its cell identifier to the different cell identifier, unlocking the non-selected cell.

9. The method in claim 6, further comprising:
detecting that the non-selected cell is already in a locked state,
subsequently detecting that the non-selected cell is in an unlocked state,
sending a cell identifier locking message to the non-selected one of the first and second cells to prevent cell identifier information from being changed at the non-selected cell, and
sending a cell identifier change message to the selected cell.

10. The method in claim 9, wherein both the first and second cell having the same cell identifier is a cell identifier conflict, the method further comprising:
determining whether the cell identifier conflict was resolved before sending the cell identifier locking message to the non-selected cell.

11. The method in claim 6, further comprising:
detecting that the selected cell is in a locked state preventing change of cell identifier information for the selected cell,
subsequently detecting that the selected cell is in an unlocked state,
sending a cell identifier locking message to the non-selected one of the first and second cells to prevent cell identifier information from being changed at the non-selected cell, and
sending a cell identifier change message to the selected cell.

12. The method in claim 11, wherein both the first and second cell having the same cell identifier is a cell identifier conflict, the method further comprising:
determining whether the cell identifier conflict was resolved before sending the cell identifier locking message to the non-selected cell.

13. The method in claim 6, wherein the selected cell is selected based on one or more of the following decision points: a lowest cell identifier at the cellular radio communications network level, a shortest neighbor cell relations (NCR) list, most recently changed cell identifier, a youngest cell, a lowest cell type, or a smallest maximum power.

14. The method in claim 1, wherein the cell identifiers are reporting cell identifiers used by UE terminals to identify cells associated with a reporting parameter provided by the UE terminals in measurement reports sent by the UE terminals to the cellular radio communications network, the method further comprising providing UE terminals with the different cell identifier for the one previously-operational cell.

15. The method in claim 1, wherein the cellular radio communications network is a long term evolution (LTE) network and the cell identifiers are measuring cell identifiers (MCIs) used by UE terminals to identify cells associated with a measurement parameter detected by the UE terminals in measurement reports sent by the UE terminals to the LTE network.

16. A method for use in a cellular radio communications network including previously-operational cells, wherein a need is detected for a cell identifier associated with one of the previously-operational cells in the cellular radio communications network that is already supporting one or more UE call connections, comprising:
a node associated with the one previously-operational cell determining neighbor cell relations (NCR) information from one or more cell(s) neighboring the one previously-operational cell;
based on the NCR information, the node determining a cell identifier for the one previously-operational cell that is different from cell identifiers indicated in the NCR information;
the node providing the different cell identifier to another cell different from the one previously-operational cell;
one or more user equipment terminals (UEs) being served by the one previously-operational cell performing measurements on the cell identifier for the one previously-operational cell when the one previously-operational cell discontinues transmission of a cell identifier signature sequence for the one previously-operational cell; and
the one or more of the UEs reporting to the one previously-operational cell a detection of the one identifier for the one previously-operational cell during a time when the one previously-operational cell discontinues transmissions of the cell identifier signature sequence for the one previously-operational cell.

17. Base station apparatus for a cellular radio communications network that includes multiple previously-operational cells that are already supporting one or more user equipment (UE) call connections, the base station serving a previously-operational cell associated with a first cell identifier and being configured with a set of allowed cell identifiers, the base station apparatus comprising electronic circuitry configured to perform the following tasks:
receive a set of occupied cell identifiers from a neighboring base station;
remove the set of occupied cell identifiers from the set of allowed cell identifiers to generate a set of available cell identifiers;
select from the set of available cell identifiers a different cell identifier different from the first cell identifier;
associate the different cell identifier with the previously-operational cell;
provide the different cell identifier associated with the previously-operational cell to one or more neighboring base stations; and
inform one or more user equipment terminals (UEs) of a discontinued transmission time period during which the one or more UEs can measure received signals from other cells in order to detect whether the cell identifier for the one previously-operational cell is received.

18. The apparatus in claim 17, wherein the electronic circuitry is configured to receive information from one or more user equipment (UE) terminals regarding occupied cell identifiers.

19. The apparatus in claim 17, wherein the electronic circuitry is configured to receive information regarding cell identifiers for other cells.

20. The apparatus in claim 19, wherein the occupied cell identifiers for other cells are each associated with a corresponding signature sequence.

21. The apparatus in claim 17, wherein the cellular radio communications network is a long term evolution (LTE) network and the cell identifiers are measuring cell identifiers (MCIs) used by UE terminals to identify cells associated with a measurement parameter detected by the UE terminals in measurement reports sent by the UE terminals to the LTE network.

22. The apparatus in claim 17, wherein the different cell identifier selection is based on one or more of the following decision points: a lowest cell identifier at the cellular radio communications network level, a shortest neighbor cell relations (NCR) list, most recently changed cell identifier, a youngest cell, a lowest cell type, or a smallest maximum power.

23. The apparatus in claim 17, wherein the electronic circuitry is configured to provide UE terminals the different cell identifier for the selected cell.

24. The base station apparatus in claim 17, wherein the set of occupied cell identifiers comprise cell identifiers currently used by one or more first neighboring cells or by one or more second neighboring cells that are neighbors to the first neighboring cells.

25. Apparatus implemented in a cellular radio communications network that includes multiple previously-operational cells that is already supporting one or more UE call connections, comprising electronic circuitry configured to perform the following tasks:
   determine neighbor cell relations (NCR) information from one or more cells neighboring a selected one of the previously-operational multiple cells;
   based on the NCR information, determine a different cell identifier for the selected cell that is different from cell identifiers indicated in the NCR information; and
   provide the a different cell identifier to one or more other cells,
   wherein the apparatus is implemented in a system of multiple cells, wherein a first cell informs one or more UEs served in the first cell of a discontinued transmission time period during which the first cell discontinues transmission of the first cell identifier and during which the one or more UEs are requested to determine whether the first cell identifier is broadcasted by another cell.

26. Apparatus implemented in a cellular radio communications network that includes multiple previously-operational cells that is already supporting one or more UE call connections, comprising electronic circuitry configured to perform the following tasks:
   determine neighbor cell relations (NCR) information from one or more cells neighboring a selected one of the previously-operational multiple cells,
   based on the NCR information, determine a different cell identifier for the selected cell that is different from cell identifiers indicated in the NCR information,
   detect that a first cell identifier associated with a first one of the multiple cells is the same as a second cell identifier associated with a second one of the multiple cells,
   select one of the first and second cells to be the selected cell and change its corresponding cell identifier,
   lock the non-selected one of the first and second cells to prevent cell identifier information from being changed at the non-selected cell, and
   after the selected cell has changed its cell identifier to the different cell identifier, unlock the non-selected cell.

27. Apparatus implemented in a cellular radio communications network that includes multiple previously-operational cells that is already supporting one or more UE call connections, comprising electronic circuitry configured to perform the following tasks:
   determine neighbor cell relations (NCR) information from one or more cells neighboring a selected one of the previously-operational multiple cells,
   based on the NCR information, determine a different cell identifier for the selected cell that is different from cell identifiers indicated in the NCR information,
   detect that a first cell identifier associated with a first one of the multiple cells is the same as a second cell identifier associated with a second one of the multiple cells,
   select one of the first and second previously-operational cells to be the selected cell and change its corresponding cell identifier,
   detect that the non-selected cell is already in a locked state,
   subsequently detect that the non-selected cell is in an unlocked state,
   send a cell identifier locking message to the non-selected one of the first and second cells to prevent cell identifier information from being changed at the non-selected cell, and
   send a cell identifier change message to the selected cell.

28. Apparatus implemented in a cellular radio communications network that includes multiple previously-operational cells that is already supporting one or more UE call connections, comprising electronic circuitry configured to perform the following tasks:
   determine neighbor cell relations (NCR) information from one or more cells neighboring a selected one of the previously-operational multiple cells,
   based on the NCR information, determine a different cell identifier for the selected cell that is different from cell identifiers indicated in the NCR information,
   detect that a first cell identifier associated with a first one of the multiple cells is the same as a second cell identifier associated with a second one of the multiple cells,
   select one of the first and second cells to be the selected cell and change its corresponding cell identifier,
   detect that the selected cell is in a locked state preventing change of cell identifier information for the selected cell,
   subsequently detect that the selected cell is in an unlocked state,
   send a cell identifier locking message to the non-selected one of the first and second cells to prevent cell identifier information from being changed at the non-selected cell, and
   send a cell identifier change message to the selected cell.

* * * * *

UNITED STATES PATENT AND TRADEMARK OFFICE
CERTIFICATE OF CORRECTION

| | | |
|---|---|---|
| PATENT NO. | : 8,588,759 B2 | Page 1 of 1 |
| APPLICATION NO. | : 11/838770 | |
| DATED | : November 19, 2013 | |
| INVENTOR(S) | : Moe et al. | |

It is certified that error appears in the above-identified patent and that said Letters Patent is hereby corrected as shown below:

In the Specification

Column 1, Line 33, delete "36,300." and insert -- 36.300. --, therefor.

Column 5, Line 50, delete "detenmine" and insert -- determine --, therefor.

Column 8, Line 46, delete "ACR)" and insert -- (NCR) --, therefor.

Column 10, Lines 45-46, delete "INITTATED" and insert -- INITIATED --, therefor.

In the Claims

Column 17, Line 34, Claim 25, delete "provide the a different" and insert -- provide the different --, therefor.

Signed and Sealed this
Fifteenth Day of July, 2014

Michelle K. Lee
*Deputy Director of the United States Patent and Trademark Office*